(12) United States Patent
Sakai et al.

(10) Patent No.: US 7,481,305 B2
(45) Date of Patent: Jan. 27, 2009

(54) LOCK-UP MECHANISM FOR TORQUE CONVERTER

(75) Inventors: Hiroyuki Sakai, Anjo (JP); Makoto Ogawa, Anjo (JP); Takamitsu Kuroyanagi, Anjo (JP); Osamu Yoshida, Takefu (JP); Eiji Hayashi, Takefu (JP); Hideki Ogawa, Takefu (JP); Tamotsu Fujii, Fukuroi (JP); Kenji Maruo, Fukuroi (JP); Hideaki Takabayashi, Fukuroi (JP)

(73) Assignees: NSK-Warner K.K., Tokyo (JP); Aisin AW Co., Ltd., Aichi-Ken (JP); Aisin AW Industries Co., Ltd., Fukui-Ken (JP)

( * ) Notice: Subject to any disclaimer, the term of this patent is extended or adjusted under 35 U.S.C. 154(b) by 218 days.

(21) Appl. No.: 11/186,867

(22) Filed: Jul. 22, 2005

(65) Prior Publication Data
US 2006/0016655 A1 Jan. 26, 2006

(30) Foreign Application Priority Data
Jul. 22, 2004 (JP) .............................. 2004-214425

(51) Int. Cl.
*F16H 45/02* (2006.01)
*F16D 13/74* (2006.01)
(52) U.S. Cl. ................................. 192/3.29; 192/113.36

(58) Field of Classification Search ............ 192/113.36, 192/58.42, 58.43
See application file for complete search history.

(56) References Cited

U.S. PATENT DOCUMENTS

| 951,992 | A | * | 3/1910 | Johnson ................... 192/107 R |
|---|---|---|---|---|
| 1,700,860 | A | * | 2/1929 | Snell ....................... 192/107 R |
| 2,316,874 | A | * | 4/1943 | Kraft ....................... 192/107 R |
| 2,728,427 | A | * | 12/1955 | Lucia .......................... 192/3.3 |
| 2,733,797 | A | * | 2/1956 | Almen et al. ............ 192/107 R |
| 4,156,479 | A | * | 5/1979 | Kawamura ............... 188/218 A |
| 4,787,482 | A | * | 11/1988 | Campbell et al. .......... 188/71.4 |
| 4,969,543 | A | * | 11/1990 | Macdonald ................ 192/3.29 |
| 5,125,486 | A | * | 6/1992 | Murata ...................... 192/3.29 |
| 6,047,806 | A | * | 4/2000 | Sasse .................... 192/113.36 |
| 2004/0035663 | A1 | * | 2/2004 | Baumann et al. ........... 192/3.29 |

FOREIGN PATENT DOCUMENTS

JP 2680632 8/1997
JP 10-318306 12/1998

* cited by examiner

*Primary Examiner*—Rodney H Bonck
(74) *Attorney, Agent, or Firm*—Miles & Stockbridge P.C.

(57) ABSTRACT

A lock-up mechanism for a torque converter comprising a lock-up clutch secured thereto with a friction liner having a friction surface, and a front cover having an engaging surface adapted to be engaged with the friction surface, is wherein either the friction surface or the engaging surface is formed therein with a substantially annular circumferential groove.

8 Claims, 2 Drawing Sheets

LOCK-UP MECHANISM FOR TORQUE CONVERTER

BACKGROUND OF THE INVENTION

1. Field of the Invention

The present invention relates to a lock-up mechanism for torque converter, which is used in an automatic transmission for a vehicle or the like, and in particular to an improvement in a friction slide surface of the lock-up mechanism.

2. Description of the Related Art

In general, a torque converter used in a vehicle automatic transmission is composed of a pump (impeller) directly coupled to a crankshaft of an engine, a turbine directly coupled to an output shaft, and a stator located therebetween.

The pump rotates upon rotation of the engine, and as a result, oil (ATF) flows from the pump into the turbine, impinging upon turbine blades so as to effect impact force which rotates the turbine, and accordingly, the output shaft is rotated. At this stage, the stator circulates the fluid between the pump and the turbine in order to increase the energy applied to the turbine.

Thus, the torque converter offers such an advantages that a vehicle enable smooth start, acceleration and deceleration, but raises such a disadvantage that its transmission efficiency is low since a power is transmitted through the intermediary of the fluid. In view of this point, when the vehicle speed exceeds a predetermined value, the stream of the fluid in the torque converter is changed by a hydraulic control mechanism which is not shown so as to press a clutch facing (friction surface) against a front cover of the torque converter. At this time, a lock-up clutch is changed over between a turn-on state and a turn-off state under hydraulic control.

As a result, the engine is mechanically coupled with drive wheels, direct thereto, and accordingly, energy loss can be decreased, thereby it is possible to improve fuel consumption. Thus, almost every of presently used automatic transmissions has a lock-up mechanism (lock-up clutch) incorporated in a torque converter.

Further, in order to materialize low fuel consumption with a high degree of efficiency throughout an entire vehicle speed range including a low vehicle speed range and a high vehicle speed range, these years, there has been dominantly used the so-called slip lock-up control, that is, such lock-up control that a slip rate is maintained at a predetermined rotational speed. The slip lock-up control can suppress vibration and noise even in a low vehicle speed range, which have been difficult to be suppressed by a direct-coupled clutch heretofore used, and accordingly, it is possible to improve the fuel consumption.

Japanese Patent No. 2680632 discloses a lock-up clutch which is formed with oil grooves on the side in opposite to a clutch facing or a friction surface. That is, grooves are formed between a friction liner and the outer surface of the lock-up clutch to which the friction liner is fixed, in order to sufficiently feed lubrication oil that permeates into the entire friction surface.

Japanese Patent Laid-Open No. 10-318306 discloses a such a configuration that a clutch facing or a friction surface is formed therein with a circular outer circumferential groove, a circular inner circumferential groove and a corrugated groove between the outer and inner peripheral grooves in order to enhance its durability and judder resistance. These three grooves are communicated with one another so as to define passages through which-fluid can flow from the inner diameter side to the outer diameter side.

The friction slide surfaces of the lock-up clutch and the front cover fall almost in a slip condition in which they slips, relative to each other. However, the friction surface of a conventional lock-up clutch and the inner surface of the front cover have a relatively low degree of flatness, and accordingly, they exhibit an unstable frictional slide condition. Thus, there has been raised such a problem that judder vibration is likely to occur. In particular, as to slip lock-up control which is recently prosperously used, it has been earnestly desirable to solve the above-mentioned problem.

In the configuration disclosed in the Japanese Patent No. 2680632, the lock-up facing is formed therein with grooves for sufficiently feeing lubrication oil which permeate the entire friction surface, between the friction liner and the outer surface of the lock-up clutch to which the friction surface is fixed, the grooves being not formed in the outer surface of the friction liner but inside of the friction lines. Thus, the above-mentioned problem can hardly be solved.

The Japanese Patent Laid-Open No. 10-318306 discloses the circular outer circumferential groove, the circular inner circumferential groove and the corrugation groove between the inner and outer circumferential grooves, which are formed in the facing or the friction surface. However, since these three grooves are communicated with one another, the fluid flows from the inner diameter side to the outer diameter side, and accordingly, hydraulic pressure is relieved when the clutch is engaged. Thus, it is difficult to maintain a stable slip condition.

SUMMARY OF THE INVENTION

Thus, an object of the present invention is to provide a lock-up mechanism for a torque converter with the provision of a circumferential groove so as to maintain such a stable slip condition that judder vibration can hardly occur.

To the end according to the present invention, there is provided a lock-up mechanism for a torque converter comprising a lock-up clutch cover secured thereto with a friction liner having a friction surface, and a front cover having an engaging surface adapted to be engaged with the friction surface, wherein either the friction surface or the engaging surface is formed therein with a substantially annular circumferential groove.

The invention as stated above can exhibit the following technical effects and advantages:

Since the substantially annular circumferential groove is formed in either the friction surface of the friction liner secured to the lock-up clutch or the surface of the front cover adapted to be engaged with the friction surface, a stable slip condition can be maintained, and accordingly, judder vibration can hardly occur. Thereby it is possible to stabilize sliding upon change-over between turn-on and turn-off of the lock-up clutch upon direct coupling, and also to stabilize sliding during slip lock-up control.

DESCRIPTION OF THE PREFERRED EMBODIMENTS

Figure 1:
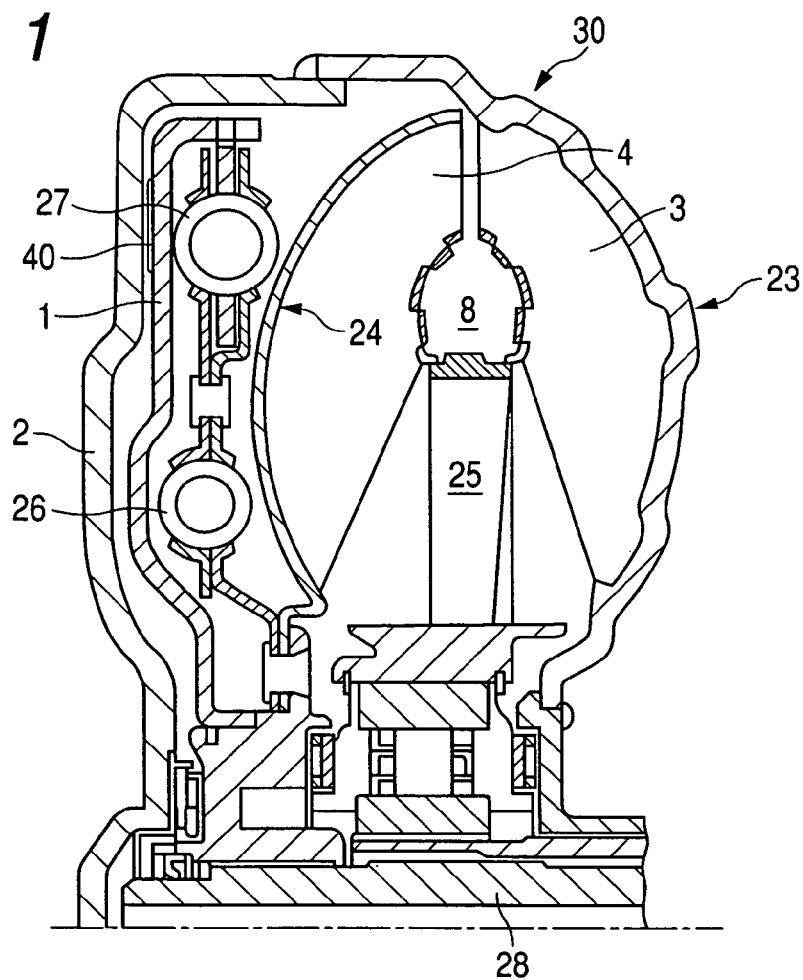
FIG. 1 is an axially sectional view illustrating a torque converter incorporated therein which a lock-up mechanism to which any of several embodiments of the present invention can be applied.

Explanation will be hereinbelow made of embodiments of the present invention with reference to the accompanying drawing in which like reference numerals used to denote like parts through out the drawings.

Referring to FIG. 1 which is an axially sectional view illustrating a torque converter 30 incorporated therein with a lock-up mechanism to which each of several embodiments of the present invention can be applied, in a condition in which a lock-up clutch is disengaged, the torque converter 30 is composed of a front cover 2 which forms a part of a housing of the torque converter 30, a doughnut-like impeller 23 secured to the front cover 2 and having blades, a doughnut-like turbine 24 having blades opposed to the blades of the impeller 23, and a stator 25 rotatably arranged between the impeller 23 and the turbine 24. The impeller 23, the turbine 24 and the stator 25 constitute a torque converter body.

The impeller 23 is coupled to a crankshaft of a vehicle engine which is not shown, and accordingly, is rotated in association with the rotation of the engine. Further, the turbine 24 is coupled to an output shaft 28, direct thereto, and is then connected to drive wheels (which are not shown) through the intermediary of a speed change mechanism which is not shown. The stator 25 is interposed between the inner peripheral centers of the impeller 23 and the turbine 24, having a function capable of changing the stream of a fluid charged in the torque converter 30.

Between the inner surface of the front cover 2 and the outer surface of the turbine 24, there is provided a piston (lock-up piston 1) of the lock-up plate, which is a ring-like plate capable of performing a piston action, and which is bonded and secured thereto with a friction liner 40 by means of an adhesive at a surface thereof opposed to the inner surface of the front cover 2, the piston 1 being rotated, integral with the output shaft 28. The friction liner 40 has a friction surface opposed to the inner surface of the front cover 2.

Between the outer surface of the turbine 24 and the piston 1, there is provided a damper mechanism composed of coil springs 26, 27 for absorbing an impact upon engagement of the piston 1. Further, the torque converter 30 defines a center space 8 in its center part.

Next, explanation will be made of operation of the piston 1. When the vehicle speed exceeds a predetermined speed, feed-back control is effected by a control mechanism which is not shown, and accordingly, the stream of the fluid in the torque converter 30 composed of the impeller 23 and the turbine 24 is changed by a hydraulic control mechanism which is not shown. In response to this change, the piston 1 under hydraulic control is pressed against the inner surface of the front cover 2 so that the friction liner 40 of the piston 1 is engaged with the inner surface of the front cover 2, resulting direct coupling of the piston 1, and accordingly, a drive power of the engine is directly transmitted to the output shaft 28. Thus, the drive side and the output side are mechanically coupled to each other with no intervening fluid thererebetween (direct coupling), resulting in no fluid loss, thereby it is possible to improve the fuel consumption.

It is noted that the toque converter 30 is connected to a hydraulic control mechanism which is not shown, and which changes, or increases and decreases the flow rate of oil while it maintains a differential pressure substantially constant between two oil passages between which the piston 1 is interposed, that is, between the outer peripheral side and the inner peripheral side, in order to maintain a slip condition of the lock-up clutch or the piston 1.

Further, the slip lock-up control is effected by changing the differential pressure between the outer peripheral side and the inner peripheral side, that is, the differential pressure between the turn-on side and the turn-off side. A hydraulic pressure for engaging the lock-up clutch is regulated and maintained under feed-back control while causing the lock-up clutch to slide in order to maintain a difference between an input rotational speed and an output rotational speed to be constant, in order to set up a semilock-up condition.

Figure 2:
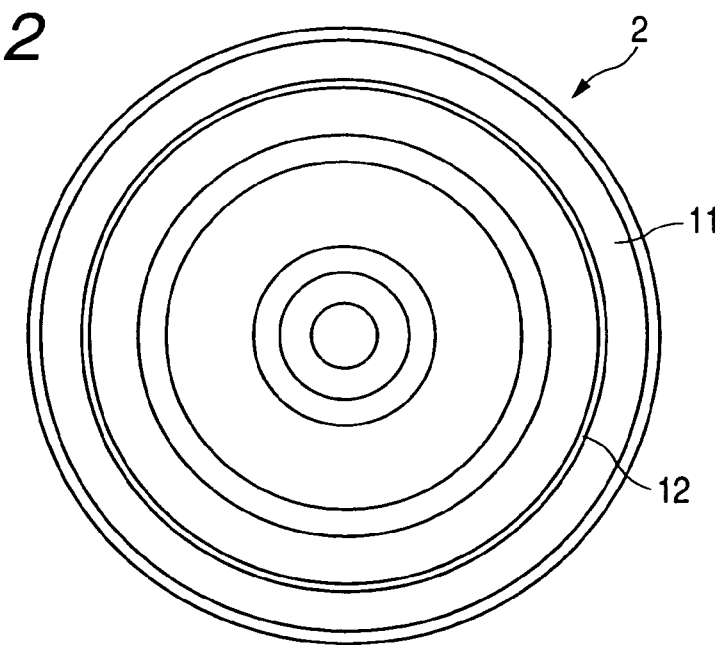
FIG. 2 is a front view illustrating a front cover in a first embodiment of the present invention.

Referring to FIG. 2 which is a front view illustrating a front cover 2 in the first embodiment, the front cover 2 is formed therein with a single substantially annular circumferential groove 12 at its engaging surface 11 which is opposed to and is adapted to engage with the friction liner 40, the circumferential groove 12 being concentric with the center axis of the front cover 2. The annular groove 12 is continuous with no interruption. Thus, in a slip condition in which the piston 1 is actuated so as to be made into close contact with the friction liner 40, ATF (automatic transmission fluid) is uniformly held in the circumferential groove 12, resulting in a stable slip condition.

Figure 3:
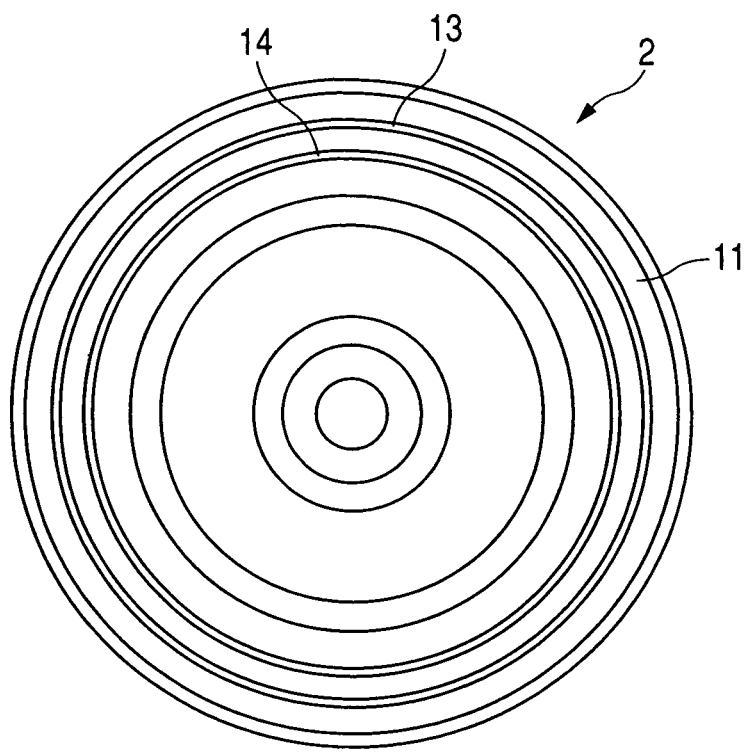
FIG. 3 is a front view illustrating a front cover in a second embodiment of the present invention.

Referring to FIG. 3 which is a front view illustrating a front cover 2 in a second embodiment of the present invention, the front cover 2 in this embodiment formed therein with substantially annular circumferential grooves 13, 14 concentric with the center axis of the front cover 2 at its engaging surface 11 which is opposed to and is adapted to be engaged with the friction liner 40. The circumferential grooves 13, 14 are continuous with no interruption, similar to the circumferential groove 12 in the first embodiment.

The circumferential grooves 13, 14 have radial widths which are substantially equal to each other, and are formed in the front cover 2, concentric with each other with a predetermined space therebetween. In a slip condition in which the piston 1 is actuated so as to be made into close contact with the friction liner 40, ATF is uniformly held in the circumferential grooves 13, 14, and accordingly, the slip condition is stabilized. In the second embodiment, since the two circumferential grooves are provided, the slip condition can be further stabilized.

In the above-mentioned first and second embodiments, the circumferential grooves are formed in the engaging surface 11 of the front cover 2, but no circumferential groove is formed in the friction liner 40 of the piston 1 which is opposed to and adapted to slide on the engaging surface 11. Further, the axial depths of the circumferential grooves 12, 13, 14 can be optionally set.

Figure 4:
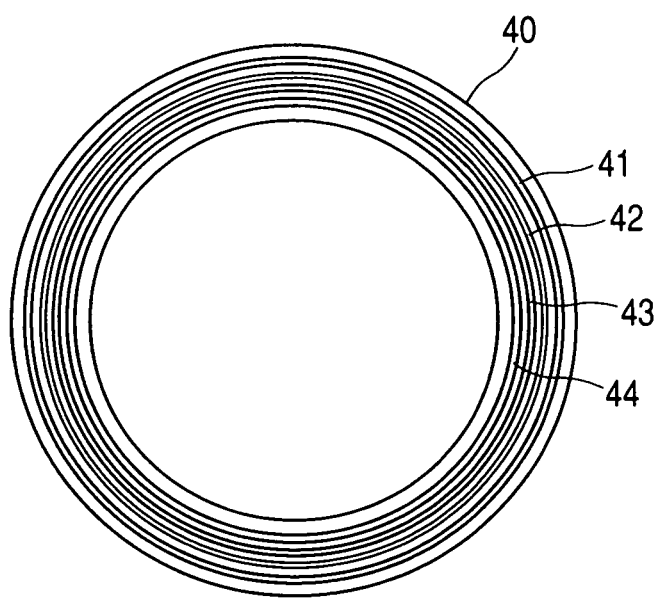
FIG. 4 is a front view illustrating a piston in a lock-up clutch in a third embodiment of the present invention.

Referring to FIG. 4 which is front view illustrating a friction liner 40 secured to the piston 1 in a third embodiment of the present invention, the friction liner 40 in this embodiment is formed therein with substantially annular circumferential grooves 41, 42, 43, 44. These four circumferential grooves 41, 42, 43, 44 are continuous with no interruption, similar to the circumferential groove 12 in the first embodiment, and are concentric with the center axis of the piston 1. In this third embodiment, only the friction liner 40 is formed therein with the circumferential grooves, but no circumferential groove is formed in the front cover 2.

The circumferential grooves 41, 42, 43, 44 are arranged, concentric with one another, having one and the same radial width and one and the same axial depth. Further, radial intervals of the circumferential grooves are also equal to one another. The circumferential grooves 41, 42, 43, 44 are formed in the friction liner 40 by pressing, but may be also formed in such a way that friction liner pieces which are obtained by cutting, concentric with one another, can be arranged at equal intervals so as to define circumferential grooves between the friction liner pieces.

The circumferential grooves 12, 13, 14, 41, 42, 43, 44 are preferably circular. Further, the number, widths, axial depths of the circumferential grooves, intervals thereof and the like can be changed optionally. Further, the circumferential grooves may be formed in the friction line 40 by any number other than four, such as, 1, 2 or 3. More over, they may be formed by a number not less than 4.

Further, in the case of provision of a plurality of circumferential grooves, although they are preferable to be concentrically circular, since it is sufficient to define gaps between the circular circumferential grooves, it is not always necessary that they are concentrically circular.

Further, as to one of the circumferential grooves, it may not be uniform circumferentially, but it may be locally different. That is, it may have large width parts and small width parts in combination. In the case of provision of a plurality of circumferential grooves, the intervals of the circumferential grooves may be equal to one another but may be not always equal to one another.

This application claims priority from Japanese Patent Application No. 2004-214425 filed Jul. 22, 2004, which is hereby incorporated by reference herein.

What is claimed is:

1. A lock-up mechanism for a torque converter for transmitting power through a fluid, said mechanism comprising:
a lock-up clutch provided with a piston having a friction surface provided with a friction material and an engaging surface disposed for engagement with the friction surface,
wherein a region of either the friction surface or the engaging surface is formed therein with a substantially circular groove that is continuous and uninterrupted and that has no communication with any other regions of the surface in which the groove is formed, said clutch being constructed so that the fluid is uniformly retained in said groove in a slip condition in which the friction surface is in a close contact with the engaging surface in order to perform slip lock-up control.

2. A lock-up mechanism according to claim 1, wherein either the friction surface or the engaging surface is formed with a plurality of such substantially circular grooves that are isolated from each other.

3. A lock-up mechanism according to claim 2, wherein the grooves are concentric.

4. A lock-up mechanism according to claim 2, wherein the grooves are formed in the friction surface.

5. A lock-up mechanism according to claim 2, wherein the grooves are formed in the engaging surface.

6. A lock-up mechanism according to claim 1, wherein the groove is formed in the friction surface.

7. A lock-up mechanism according to claim 1, wherein the groove is formed in the engaging surface.

8. A lock-up mechanism in a torque converter for transmitting power through a fluid, said mechanism having a front cover with a friction surface provided with a friction material, and a lock-up clutch provided with a piston having an engaging surface disposed to be engaged with the friction surface,
wherein a region of either the friction surface or the engaging surface is formed with a substantially circular groove therein that is continuous and uninterrupted and that has no communication with any other regions of the surface in which the groove is formed, said lock-up mechanism being constructed so that the fluid is uniformly retained in said groove in a slip condition in which the friction surface is in a close contact with the engaging surface in order to perform slip lock-up control.

* * * * *